United States Patent Office 2,788,870
Patented Apr. 16, 1957

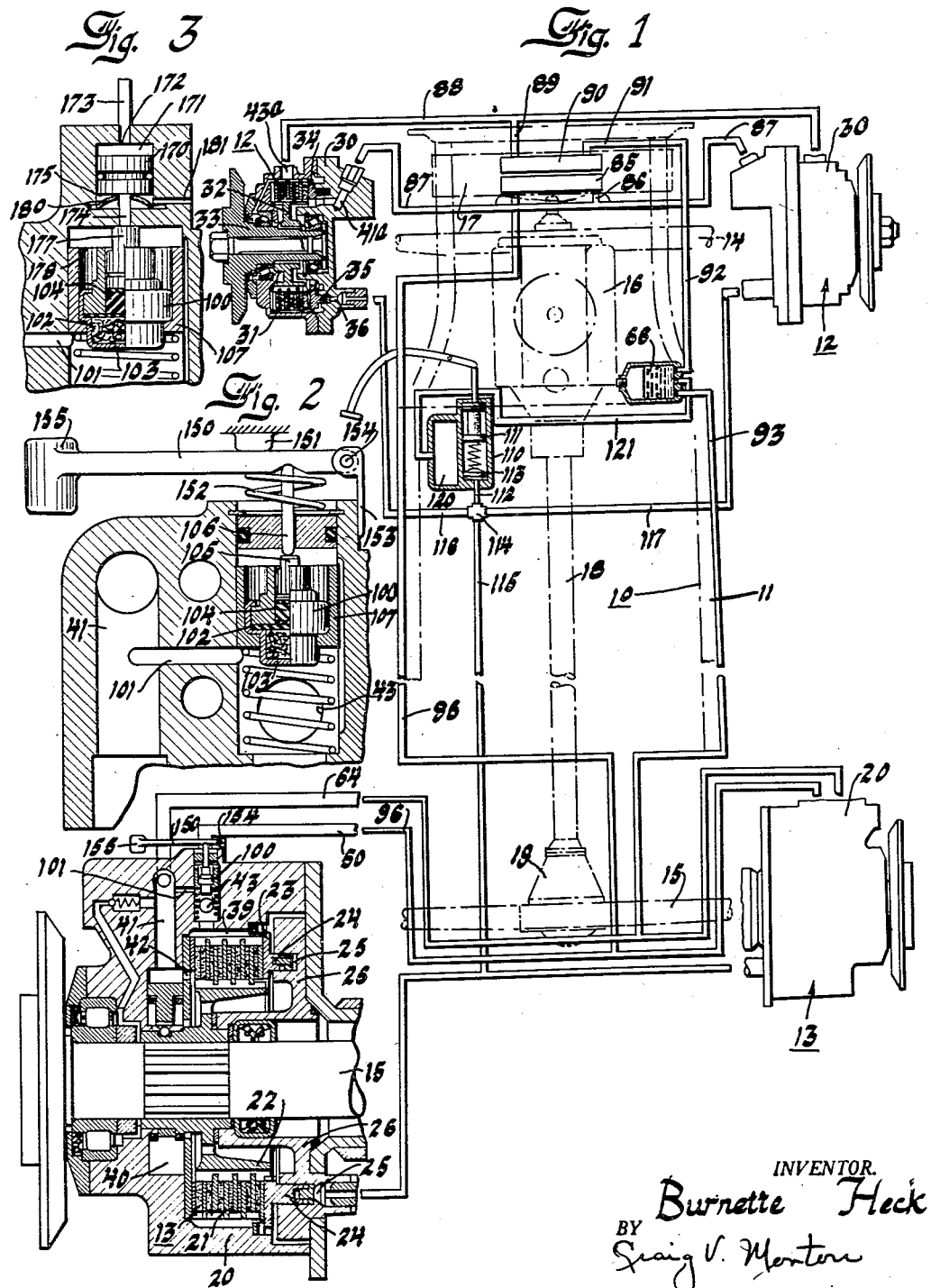

2,788,870

FLUID COOLING SYSTEM FOR LIQUID COOLED FRICTION BRAKES

Burnette Heck, Detroit, Mich., assignor to General Motors Corporation, Detroit, Mich., a corporation of Delaware Application September 23, 1955, Serial No. 536,105

8 Claims. (Cl. 188—264)

This invention relates to a cooling system for circulating the cooling fluid through friction brakes to remove the heat of friction and to control apparatus for regulating the flow of coolant.

One of the problems concerning the use of liquids in brake cooling systems for use on motor vehicles that operate under wide temperature conditions involves the change in viscosity of the liquids used in the cooling system resulting from atmospheric temperature changes. It is well known that when the temperature of liquids is reduced, the viscosity of the liquid substantially increases. Since automotive vehicles operate at temperatures from conditions of desert heat to frigid arctic conditions, the viscosity of the liquid used in a cooling system will vary over a wide range.

As the viscosity of the liquid increases, the friction loss created as a result of transfer of the liquid through a brake cooling circulating system by means of a pump operated by the engine of a vehicle will cause horsepower absorption which results in a less overall efficiency of operation of the vehicle engine, since the more viscous cooling fluid circulated through the brakes for cooling results in a greater pressure drop in the circulating system and a greater friction drag between the rotating and stationary plates of the brake even when the brake is in a released condition.

As a result, it is desirable that under low temperature conditions the cooling system for the brake coolant be by-passed until the temperature of the cooling fluid is brought to a predetermined minimum operating temperature as rapidly as possible to reduce pressure drop of the liquid when circulating in the system and the friction drag created by the viscous liquid as quickly as possible after the motor vehicle has started its operation.

However, should emergency stop conditions arise before the temperature of the cooling fluid has risen to the desired minimum temperature at which circulation through the cooling system for the liquid coolant is started, it is desirable to render the by-pass arrangement ineffective and provide for immediate circulation of the cooling fluid through its cooling or heat exchange system to prevent any undue heating of the brakes which would arise on a heavy application of the brakes. Such a condition can easily arise on a cold winter day when a vehicle is operated after a long idle period.

It is therefore an object of this invention to provide a liquid circulating system for circulating a coolant or cooling fluid through friction brakes of a vehicle in which the circulating fluid is maintained in a minimum circulation system within the brakes of a vehicle until such time as the temperature of the cooling fluid reaches a predetermined minimum temperature except when emergency stop conditions arise requiring heavy application of the brakes sufficient to cause heating of the brakes if the brake coolant is not circulated through a heat exchange system.

It is another object of the invention to provide a fluid circulating cooling system for friction brakes of a vehicle wherein a pump is carried by a wheel or wheels of the vehicle for circulating cooling fluid through the brakes of the vehicle with the pump being operably connected with a thermally actuated valve by which the cooling fluid is circulated from the outlet directly to the inlet of the pump without passage through any heat exchange medium which tends to cool the liquid until after the cooling liquid has reached a minimum operating temperature except when the vehicle is decelerated at a high rate before the cooling liquid has reached the minimum temperature.

It is another object of the invention to provide a fluid circulating system for cooling friction brakes in accordance with the foregoing object wherein a thermally actuated valve will be effective to cause the circulating cooling fluid to by-pass a heat exchange circuit external of the wheel carrying the circulating pump and maintain pump circulation entirely within the brake and wheel until the temperature of the circulating fluid reaches a predetermined minimum temperature except when the brakes are applied before the temperature of the cooling fluid has reached a predetermined minimum temperature, under which condition the valve will be actuated to effect circulation of the cooling fluid through a heat exchange circuit at least until the brake application is completed.

Further objects and advantages of the present invention will be apparent from the following description, reference being had to the accompanying drawings wherein a preferred form of the invention is clearly shown.

In the drawings:

Figure 1 is a schematic view illustrating a fluid circulating system for the friction brakes of a vehicle incorporating features of this invention.

Figure 2 is a cross sectional view of a thermally responsive valve for controlling the circulation of cooling fluid in the system shown in Figure 1.

Figure 3 is a cross sectional view of a modified arrangement of the thermally responsive valve for controlling the circulation of cooling fluid in the system shown in Figure 1.

In this invention there is illustrated a system for cooling friction brakes of a vehicle by circulating cooling fluid through the brakes and then through a heat exchange system to remove heat from the cooling fluid. The cooling fluid is circulated by a pump carried in one or more of the wheels of the vehicle. A thermally responsive valve is carried by the wheel of the vehicle that carries the pump for circulating the cooling fluid with the valve controlling a by-pass passage between the outlet and inlet of the pump to retain all circulating cooling fluid in circulation within the brake and wheel carrying the pump until the temperature of the fluid in the by-pass circulating circuit reaches a predetermined minimum temperature. This arrangement completely by-passes all heat exchangers and circulating lines that can also act as a heat exchange medium.

However, should an above average braking condition arise before the cooling fluid has risen in temperature to the predetermined minimum temperature, a sudden accumulation of heat can occur in the cooling fluid in the brake before the thermally responsive valve has time to respond to the heat rise resulting in overheating of the fluid and the brake components. Under this condition it is desirable to render the by-pass circuit ineffective and immediately direct the cooling fluid from the brake into the heat exchange circuit irrespective of the temperature of the cooling fluid.

In the drawing there is shown a vehicle 10 on which the brake system of this invention is applied. The vehicle 10 comprises a conventional frame 11 on which there is supported front wheel brakes 12 and rear wheel brakes 13.

The front wheel brakes are supported on the usual suspension system carried on a cross frame member 14. The rear wheel brakes 13 are carried on the rear axle 15.

The frame 11 also supports a vehicle engine 16 operably connected with a radiator 17 through which water is circulated for cooling the engine. The engine 16 is connected to the rear axle through a conventional drive shaft 18 and differential 19.

The rear wheel brakes 13 each comprise a housing 20 containing a multiple disk assembly 21 providing the friction brake. Some of the disks of the assembly 21 are carried by the stationary housing 20 while other of the disks are supported upon the rotating hub 22 that is supported upon the rear axle 15. The brake disks of the disk assembly 21 are brought into frictional engagement for a braking operation by means of actuation of a pressure plate 23 having an annular projection 24 that operates in an annular groove 25 provided in the housing member 26 whereby to provide a wheel cylinder to receive hydraulic brake actuating fluid.

The front wheel brake 12 consists of a housing 30 that encloses a multiple disk assembly 31 forming the friction brake. Some of the disks of the assembly 31 are carried by the stationary housing 30 while other of the disks are carried by the rotating hub 32 that in turn is supported on the rotating axle spindle 33. A pressure plate 34 is provided at one side of the disk assembly 31 and has an annular projection 35 positioned in an annular groove 36 that forms a wheel cylinder for receiving hydraulic fluid under pressure from a hydraulic actuating system for operation of the brake.

The rear brake 13 includes a vane type pump 40 that is keyed to the hub 22 so as to effect circulation of fluid by the pump when the wheel axle 15 is rotated. The pump 40 receives fluid through the inlet 41 and delivers fluid under pressure through an outlet passage 42 into the brake chamber 39 that contains the disk assembly 21. Fluid under pressure is circulated between the disks 21 and is discharged from the housing through the passage 43.

Similarly, fluid under pressure is delivered into the front wheel brake 12 through a passage 41a for circulation between the disks 31 and is discharged from the brake 12 through a passage 43a.

It will thus be seen that both the front and rear wheel brakes 12 and 13 are constructed and arranged to receive fluid under pressure for circulation through the brake to remove the heat of friction caused by braking engagement of the disk assemblies 21 and 31, the rear wheel brake 13 being provided with a pump to effect the desired circulation of fluid through both the front and rear brakes through a circulating system hereinafter described.

The fluid circulating system for the circulation of cooling fluid through the front and rear wheel brakes includes a fluid discharge line 50 that receives fluid under pressure from the pumps 40 of the rear wheel brake assemblies as exhausted from the brakes through the port 43. Since both rear wheel brakes are identical in structure, only one is described and referred to.

The fluid under pressure in the discharge line 50 connects with a fluid circulating line 96 through which fluid under pressure is delivered to a heat exchanger 85 that is located in the bottom portion of the engine radiator 17. The outlet line 86 of heat exchanger 85 is connected by means of a fluid circulating line 87 with the inlet port 41a of the front wheel brake 12.

The fluid circulated through the front wheel brake 12 is exhausted through the port 43a into the fluid circulating line 88 that in turn is connected through the line 89 with the inlet side of a second heat exchanger 90 also located in the bottom portion of the engine radiator 17 and adjacent the heat exchanger 85. The discharge line 91 of the heat exchanger 90 connects with a fluid circulating line 92 that is connected with the fluid reservoir 66. The fluid reservoir 66 is connected by means of a fluid circulating line 93 with the inlet line 64 that delivers fluid into the suction inlet 41 for the pump 40.

In the system thus far described the pump 40 will continuously circulate cooling fluid through the circulating system whenever the wheel axle 15 rotates. However, under low temperature atmospheric conditions the viscosity of the cooling fluid will be considerably higher than under high temperature atmospheric conditions. If the pump 40 is to circulate cooling fluid through the circulating system under the low temperature conditions, the fluid will be cooled in the heat exchangers 85 and 90 with the result that the temperature of the cooling fluid will remain at a low value for a considerable period of time, the resulting high viscosity of the fluid effecting a high pressure drop through the circulating system and high friction in circulation through the brake-disk assemblage 21, with the result that high power loss is obtained at the axle 15.

Under these conditions it is desirable to provide a thermally responsive device 100 that controls a by-pass port 101 between the discharge passage 43 from the exhaust side of the brake chamber 39 and the inlet passage 41 to the pump 40 to by-pass the heat exchange system until the temperature of the brake cooling fluid reaches a predetermined minimum temperature. When the by-pass port 101 is open, as illustrated in Figure 2, the cooling fluid circulated by the pump will circulate only internally of the wheel containing the pump, the resistance to flow in the conduit lines of the heat transfer circulating system being sufficient to resist circulation of fluid in the circulating system so long as the by-pass port 101 remains open.

The thermally responsive device 100 comprises a body 102 containing an expansible mass 103 that expands upon a rise in temperature. Expansion of the mass 103 causes the resilient rubber plug 104 to move the plunger 105 against the pin 106 that engages a lever 150 normally held against a stationary stop 151 by a spring 152 to cause the piston 107 that carries the thermally responsive device 100 to move downwardly in the passage 43 and thereby close off the by-pass port 101.

The lever 150 is pivotally mounted on a bracket 153 by a pivot pin 154, the bracket being secured to the body of the stationary housing 20 in any suitable manner. The free end of the lever 150 carries a weight 155 which is the motivating element for the lever. The weight 155 is responsive to the deceleration rate of the motor vehicle. Thus when the brakes are applied sufficiently hard, the kinetic energy of the weight 155 will cause it to move the lever 150 about the pivot 154 to move the pin 106 against the thermally responsive device 100 to move it and the piston 107 downwardly in the passage 43 and close off the by-pass port 101.

The thermally responsive device 100 is illustrated in the drawing in the position it attains when the ambient or atmospheric temperature conditions are relatively low. It is desirable for all of the coolant or cooling fluid in the circulating system to rise to a temperature of about 180° F. as quickly as possible, and thereafter remain at substantially this temperature during circulation through the wheel brakes to remove heat of friction from the brakes. Thus the thermally responsive device 100 is adapted normally to maintain the by-pass port 101 open until the temperature of the coolant circulating from the exhaust passage 43 through the by-pass port 101 and into the suction inlet line 41 to the pump 40 reaches a temperature of about 180° F. When this temperature condition is reached the piston 107 will close the by-pass port 101 and force the coolant to flow through the exhaust line 50 into the coolant circulating system for removal of heat by the heat exchangers 85 and 90, and for circulation through the front wheel brakes as well as the rear wheel brakes.

However, under the conditions of unusually heavy brake applications before the temperature of the cooling fluid has risen to the desired value, the by-pass port 101 will be closed in response to the deceleration rate of the vehicle irrespective of the temperature of the brake cooling fluid. The spring 152 may be calibrated so that the kinetic energy of the weight 155 will not actuate the lever 150 so long as the deceleration rate of the vehicle is below a predetermined value.

The front and rear wheel brakes are operated by a hydraulic actuating system that includes a master cylinder 110 having a displacement piston 111 therein for delivering fluid under pressure into the supply line 112. A check valve 113 of conventional type is provided in the master cylinder 110 to retain a residual pressure in the supply line 112 whenever the brakes are in a released condition. The supply line 112 connects with a junction block 114 that in turn has the supply lines 115, 116 and 117 extending therefrom to supply the wheel cylinders 25 and 36 of the rear and front brakes 13 and 12 respectively.

The master cylinder 110 is provided with a fluid reservoir 120 from which make-up fluid is supplied to the master cylinder for any loss of fluid occuring in the hydraulic actuating brake system. The reservoir 120 is connected by means of a pipe line 121 with the reservoir 66 of the cooling fluid circulating system so that the reservoir 66 will in turn supply fluid to the master cylinder so long as any fluid is present in the cooling fluid circulating system.

In Figure 1 of the drawing, the reservoir 66 is illustrated as being along side the master cylinder 110 and its reservoir 120, but in actual practice the reservoir 66 will be positioned at a higher level than the reservoir 120 of the master cylinder 110 so that fluid from the reservoir 66 will drain by gravity into the reservoir 120 for supply of fluid thereto so long as any fluid enters the reservoir 66. This arrangement insures a supply of hydraulic fluid to the hydraulic actuating system for the brakes so long as there is any fluid existing in the fluid cooling circulating system. Thus the operator of the vehicle will be in a position to actuate the brakes irrespective of whether or not they are being cooled, and under emergency conditions will therefore be able to bring the vehicle to a stop.

In Figure 3 there is illustrated a modified arrangement of the thermally responsive mechanism in which the thermally responsive device 100 is adapted to be actuated concurrently with actuation of the brakes of the vehicle and by the hydraulic fluid that actuates the brakes. In the modified arrangement there is provided a small piston 170 that is reciprocably mounted in the cylinder bore 171 that is supplied with hydraulic fluid under pressure through the inlet port 172 that is connected with the discharge line 112 of the master cylinder 110 by means of a line 173. The piston 170 engages a pin 174 slidably received in the guide bore 175, the pin 174 engaging the actuating pin 177 of the thermally responsive device 100. Normally the pin 177 engages the wall 178 that receives the thermally responsive device so that upon expansion of the mass 103, the by-pass port 101 will be closed upon downward movement of the piston 107. A Belleville type spring 180 is provided to resist movement of the piston 170. A vent port 181 can be provided to prevent entrapment of fluid below the piston 170.

When the brakes are applied by operation of the master cylinder 110, fluid under pressure will be supplied through the line 173 to move the piston 170 downwardly whereby to effect movement of the pin 174 and thereby bodily movement of the thermally responsive device 100 to close the by-pass port 101. Preferably, the spring 180 is calibrated to resist movement of the piston 170 until a predetermined pressure is built up in the fluid supply line 173, which value of pressure would represent an unusually hard brake application.

It will therefore be seen that the device of Fig. 3 responds to unusually heavy application of the brakes to close off the by-pass port 101 irrespective of the temperature of the cooling fluid.

While the form of embodiment of the invention herein disclosed constitutes a preferred form, it is to be understood that other forms might be adopted as may come within the scope of the claims which follow.

What is claimed is as follows.

1. Brake mechanism for a vehicle, comprising in combination, a vehicle wheel including brake means for the wheel, pump means within the wheel to circulate cooling fluid through said brake means, means providing a heat exchange circuit means including heat exchange means externally of the wheel connected with said pump and brake to effect cooling of said circulating cooling fluid, flow control valve means carried by said wheel responsive to the temperature of cooling fluid from the brake means to effect flow circulation of the cooling fluid from the brake means to the pump means in by-pass relation to the external heat exchange circuit and the heat exchange means when the temperature of the cooling fluid from the brake means is below a predetermined value, and means responsive to brake actuation effective to render ineffective the by-pass of the external heat exchange circuit by the said valve means and effect thereby cooling fluid circulation through the heat exchange circuit even when the temperature of the cooling fluid is below the said predetermined value.

2. Brake mechanism in a vehicle in accordance with claim 1 in which the means responding to brake actuation is activated by deceleration of the vehicle.

3. Brake mechanism for a vehicle in accordance with claim 1 in which the means responding to brake actuation includes means activated by deceleration of the vehicle above a predetermined rate of deceleration.

4. Brake mechanism for a vehicle in accordance with claim 1 in which the means responding to brake actuation comprises fluid actuated means actuated by the pressure of the hydraulic fluid actuating the said brake means.

5. Brake mechanism for a vehicle, comprising in combination, a vehicle wheel including brake means for the wheel, pump means within the wheel to circulate cooling fluid through said brake means, means providing a heat exchange circuit means including heat exchange means externally of the wheel connected with said pump and brake to effect cooling of said circulating cooling fluid, flow control valve means carried by said wheel responsive to the temperature of cooling fluid from the brake means to effect flow circulation of the cooling fluid from the brake means to the pump means in by-pass relation to the external heat exchange circuit and the heat exchange means when the temperature of the cooling fluid from the brake means is below a predetermined value, and means operably connected with said flow control valve means to actuate the same in response to brake actuation to render ineffective the said by-pass of the heat exchange circuit and effect circulation of the cooling fluid through the heat exchange circuit even though the temperature of the cooling fluid is below the said predetermined value.

6. In a vehicle, the combination of, a plurality of wheels each having brake means therein each constructed and arranged for flow of fluid coolant through the brake means when in engaged condition, a heat exchange circuit including heat exchange means connected with the said brake means for cooling the coolant circulated through the brake means, pump means in some of the wheels and driven thereby and connected with the said heat exchange circuit for positive circulation of coolant fluid through the said circuit and the brake means connected therewith, coolant flow control valve means in the wheel containing the said pump means responsive to temperature of coolant in the said wheel providing for positive circulation only within the said wheel containing the said pump means so long as the coolant temperature is below a predetermined value and providing for positive coolant circulation through all of said brake means and the said heat exchange circuit when the coolant temperature is above the said predetermined value, and means operably connected with said flow control valve means responsive to brake actuation to operate said flow control valve means to provide for positive coolant circulation through all of said brake means and the said heat exchange circuit when the brake means is activated irrespective of whether the coolant temperature is above the said predetermined value.

7. Apparatus in accordance with claim 6 in which the means operably connected with said flow control valve means for actuating the same is responsive to deceleration of the vehicle.

8. Apparatus in accordance with claim 6 in which the means operably connected with said flow control valve means for actuating the same comprises fluid actuated means actuated by and concurrently with hydraulic fluid for actuating the said brake means.

References Cited in the file of this patent

UNITED STATES PATENTS

| | | |
|---|---|---|
| 2,195,130 | Hoyt | Mar. 26, 1940 |
| 2,378,100 | Pogue | June 12, 1945 |
| 2,471,858 | Bloomfield | May 31, 1949 |

FOREIGN PATENTS

| | | |
|---|---|---|
| 1,095,884 | France | Dec. 29, 1954 |